United States Patent
Terao et al.

(10) Patent No.: US 7,349,319 B2
(45) Date of Patent: Mar. 25, 2008

(54) INFORMATION RECORDING APPARATUS, RECORDING MEDIA AND RECORDING METHOD

(75) Inventors: Motoyasu Terao, Hinode (JP); Kyoko Kojima, Kunitachi (JP); Hiroyuki Minemura, Kokubunji (JP); Takeshi Maeda, Kokubunji (JP); Takeshi Shimano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 681 days.

(21) Appl. No.: 10/763,274

(22) Filed: Jan. 26, 2004

(65) Prior Publication Data

US 2005/0047309 A1    Mar. 3, 2005

(30) Foreign Application Priority Data

Sep. 1, 2003    (JP)    ............................. 2003-308197

(51) Int. Cl.
*G11B 7/00* (2006.01)

(52) U.S. Cl. ..................................... 369/108
(58) Field of Classification Search ................. None
See application file for complete search history.

(56) References Cited

U.S. PATENT DOCUMENTS

| | | | |
|---|---|---|---|
| 3,801,966 A | | 4/1974 | Terao |
| 3,986,771 A | * | 10/1976 | Tsukada ..................... 399/178 |
| 4,842,381 A | * | 6/1989 | Green ......................... 359/269 |
| 5,734,637 A | * | 3/1998 | Ootaki et al. .......... 369/112.02 |
| 6,160,787 A | * | 12/2000 | Marquardt, Jr. et al. . 369/275.1 |
| 2005/0084660 A1 | * | 4/2005 | Kojima et al. .............. 428/209 |
| 2005/0094532 A1 | | 5/2005 | Akiyama et al. |
| 2005/0135218 A1 | | 6/2005 | Akiyama et al. |
| 2005/0207314 A1 | * | 9/2005 | Wada et al. ........... 369/112.08 |
| 2005/0276211 A1 | * | 12/2005 | Hirotsune et al. ....... 369/272.1 |
| 2007/0109218 A1 | * | 5/2007 | Saito et al. ................... 345/55 |

FOREIGN PATENT DOCUMENTS

| | | |
|---|---|---|
| CN | 1250931 A | 10/1999 |
| JP | 52-21335 | 8/1971 |
| JP | 2004103210 A * | 4/2004 |

OTHER PUBLICATIONS

M. Terao et al., "Highly Sensitive Amorphous Optical Memory", Proceeding of the 4th Conference on Solid State Devices, Tokyo, 1972, Supplement to the Journal of The Japan Society of Applied Physics, vol. 42 (1973), pp. 233-238.

Helmut W. Heuer et al., Electrochromic Window Based on Conducting Poly (3,4-ethylenedioxythiophene)-Poly(styrene sulfonate), Advanced Functional Materials, No. 2, Feb. 2002, pp. 89-94.

Fei Wang et al., "Electrochromic Linear and Star Branched Poly(3,4-ethylenedioxythiophene-didodecyloxybenzene) Polymers", American Chemical Society (2000), Macromolecules, pp. 2083-2091.

Dean DeLongchamp et al., "Layer-by-Layer Assembly of PEDOT/Polyaniline Electrochromic Devices", Advanced Materials, vol. 13, No. 19, Oct. 2, 2001, pp. 1455-1459.

Shizuo Tokito et al., "Organic Electroluminescent Device", with English abstract, R&D, vol. 33, No. 2 (1998), pp. 2-22.

* cited by examiner

*Primary Examiner*—Wayne Young
*Assistant Examiner*—Parul Gupta
(74) *Attorney, Agent, or Firm*—Reed Smith LLP; Stanley P. Fisher, Esq.; Juan Carlos A. Marquez, Esq.

(57) ABSTRACT

An information recording apparatus includes a multilayer information recording medium having a first layer containing an electro-chromic material, an electrode layer applying a voltage to the first layer to color the first layer, a second layer containing an electro-chromic material, a unit for applying the voltage to the first layer, a first optical irradiating unit for irradiating a first optical spot onto the first layer, and a second optical irradiating unit for irradiating a second optical spot onto the second layer after irradiating the first optical spot onto the first layer.

12 Claims, 7 Drawing Sheets $\lambda/NA^2$ ($\mu$m)

INFORMATION RECORDING APPARATUS, RECORDING MEDIA AND RECORDING METHOD

BACKGROUND OF THE INVENTION

1. Field of the Invention

The present invention is related to an information recording apparatus, an information recording method and an information recording medium, which record and reproduce information by using light.

2. Description of the Related Art

Optical disks may constitute the following major features. That is, semiconductor lasers can be used as light sources, recording media (disks) can be unloaded from recording/reproducing apparatus, and cost per bit of recording media is inexpensive. As a consequence, high density and high-speed recording/reproducing operations are desirably realized without loosing these features in optical disk apparatus.

To increase recording capacities in these days, the optical disks are known in this field, on which information is recordable on transparent organic materials in a three-dimensional direction involving a thickness direction. However, in the optical disks using two photon absorptions, large-scaled lasers on single-crystal recording media are required. In the optical disks using optical polymerization, storage stabilities and recording sensitivities are deteriorated. In hologram recording optical disks, these optical disks can be hardly loaded/unloaded.

In order to realize the recording operations in high speeds, there is limitation in such a case that the rotation speeds of optical disks are increased. Since the optical disks own such feature that they can be loaded/unloaded, and plastic base plates are also employed in recording media to realize low cost, there is no way capable of avoiding upper/lower oscillations of outer circumferential portions of these optical disks and decentering of these optical disks. When the rotation speeds of optical disks are increased, the upper/lower oscillations and decentering of these optical disks become high frequencies, so that auto-focusing operations and tracking operations can be hardly followed. As a consequence, if the rotation speeds are increased at higher levels than a certain level, then parallel recording operations must be taken into account. As to using the parallel recording system, multi-beam recording systems have been conventionally proposed.

On the other hand, the following experimental results have been reported with U.S. Pat. No. 3,801,966 and M. Terao et al., "Highly Sensitive Amorphous Optical Memory" Supplement to the Journal of the Japan Society of Applied Physics Vol. 42, pages 233 to 238 in 1973). That is, both a photo-conductor and a phase-change recording film are sandwiched by transparent electrodes, when a light is irradiated while a voltage is applied by way of these transparent electrodes, photo-currents are multiplied, so that information can be recorded by using a weak laser light by 2 digits, as compared with that obtained when only the laser light is irradiated.

In the above-described parallel recording system using the multi-beam recording operation, after information has been read/written over one circumferential track, a large track jump is required over a long distance corresponding to a total beam number. Also, this parallel recording system owns another problem that formats of an optical disk are different from each other every total beam number. This problem may be solved by such a way that the respective optical spots produced by collecting the multi-beams may own focal points on the different layers of a multilayer recording medium. To this end, an optical axis involving setting angles of lasers is inclined, or a lens is inclined. For example, in such a case of a phase-change write-once type 4-layer recording medium in 4-beam simultaneous recording system, optical absorptions and thermal diffusion are designed in such a manner that recording sensitivities of 4 layers may become substantially identical to each other. However, in this recording system, in order to prevent interlayer crosstalk, since a layer interval is large, i.e., approximately 20 µm, an optical axis must be largely inclined, as illustrated in FIG. 9. Thus, there are problems that laser beams can be hardly collected due to aberration, and a lens impinges on an optical disk. For instance, in the case that a semiconductor array laser whose beam interval is 100 µm is employed, an optical spot interval becomes approximately 10 µm based upon an NA ratio of a collimator lens to a focusing lens. As a result, if a layer interval of an optical disk is equal to 20 µm, then a tangent value of an inclination becomes 2. Therefore, there are problems that the laser beams can be hardly collected due to aberration and the focusing lens impinges on the board. As a consequence, a plurality of individual lasers must be adhered to each other with securing stepped portions, by which precision and manufacturing yield of such a semiconductor array laser can be hardly increased. Also, since the respective layers of the optical disk own optical absorptions, recording sensitivities thereof are lowered, and thus, there are some possibilities that recording speeds are delayed due to a lack of laser power. It should be noted that, in FIG. 9, a reference numeral 91 shows a base plate, 92 shows a recording layer and 93 indicates a spacer layer, and further, 94 denotes a reflection layer.

As described in U.S. Pat. No. 3,801,966 and "Highly Sensitive Amorphous Optical Memory" written by M. Terao et al., Supplement to the Journal of the Japan Society of Applied Physics Vol. 42, pages 233 to 238, in 1973, since the recording sensitivity is extremely high, the high speed recording operation can be carried out by employing the above-described arrangement without a lack of laser power. Also, in such a case that an optical disk is made of multiple layers to realize a large storage capacity, even when laser light is irradiated onto adjoining layers, if a voltage is not applied thereto, then information is not recorded/reproduced. As a result, layer selective characteristics may be obtained. However, since an optical absorption is slightly required, the laser light can be hardly reached to deeper layers due to the optical absorption.

SUMMARY OF THE INVENTION

An object of the present invention is to solve these problems of the above-described conventional techniques.

An arrangement of the present invention employed in order to solve the above-described problems will now be described.

As to a multilayer recording medium used in an information recording/reproducing apparatus and information recording/reproducing method, according to the present invention, while an electrically layer selective multilayer recording medium is employed, basic states of the respective recording layers are brought into transparent states. Only such a layer is colored by applying a plus voltage between electrode layers which sandwich a recording layer. If a coloring function is lost by irradiating the recording laser light and then a recording mark is formed, when an entire layer is returned to the transparent state, the formed recording mark cannot be observed, which causes no trouble when other layers are recorded/reproduced. As a result, since there is no interference caused by other layers, the layer intervals can be narrower, so that a total number of layers of this multilayer recording medium and a storage capacity thereof can be increased, as compared with those of the conventional plural-layer disk. Specifically speaking, since the layer interval is shorter than or equal to 1 µm, even when the spot interval is equal to 10 µm, the inclination angle of the laser beam axis can be decreased.

In this specification, it is so assumed that an electro-chromic material layer designates a layer of material which directly develops a color (absorption spectrum is changed) by applying thereto a voltage (namely, current will flow), and also, another layer having both an area which emits light by applying thereto a voltage and another area which develops a color or de-color by receiving this light emitted from the area. In a recording medium operable in the above-described manner, as a recording layer, a stacked layer film made by stacking either an organic or inorganic electro-chromic material layer and a solid electrolyte layer may be employed. Alternatively, either a mixed material layer or a stacked layer film may be employed as the recording layer, which is formed by mixing an electroluminescent material with a photo-chromic material. As a result, only an arbitrary layer may absorb light, and other layers may not absorb light. When a multi-stacked layer is formed, there are some cases that pits and/or grooves indicative of address information are deformed, since a thin layer to which the pits and the grooves have been transferred is provided every time several layers are stacked, depending upon a certain case, an address of at least a partial layer within a focal depth is required to be readable at a moved focal point. As the electro-chromic material, for instance, a tungsten oxide, and polymers of thiophene derivatives may be listed up.

Furthermore, as the above-described electro-chromic material, a large number of electro-chromic materials may be used which have been so far announced in theses, e.g., various sorts of materials which are described in Japanese book entitled as "ELECTRO-CHROMIC DISPLAY" issued by SANGYO TOSHO K.K., June 28 in 1991.

Alternatively, a phase-change recording layer (for example, layer made of $Ge_2Sb_2Te_5$) may be provided between an electro-chromic material layer and either a first electrode or a second electrode, which sandwich this electro-chromic material layer. When the phase-change recording layers are provided on the light incident side and the opposite side thereto, the resultant structure may become optically desirable. In this case, assuming now that the electro-chromic layer owns a high recording threshold value, a layer having a low melting point is selected as the phase-change recording layer, which involves sulfur such as $Sb_4Te_3S_2$, so that a recording operation occurs only in the phase-change recording layer. Alternatively, the electro-chromic layer may be removed. If the phase-change recording layer is provided in the above-described manner, then recorded information may be rewritten. Also, the electro-chromic layer itself may function as a photo-conductor layer, and may function as a layer whose phase is changed, so that either a coloring or de-coloring characteristic is changed.

Alternatively, a structure may be constructed in which a photo-conductor layer is provided between either a first electrode or a second electrode and a recording film. It is better to provide the photo-conductor layer adjacent to the electrode located on the light incident side rather than the recording film. In this case, since photo-carriers produced at the photo-conductor layer are moved by irradiating the light, the resistance value of the photo-conductor layer is decreased, and both the voltage and the current related to the recording layer are rapidly increased, so that the temperature at the recording lay of the light irradiated portion is increased. As a result, the recording layer is brought into a recording state. The photo-carriers may be alternatively increased based on the avalanche multiplication effect. As previously explained, when the photo-conductor film is provided, since the high density current may be supplied to the recording film, energy of the optical irradiation may be lowered.

It should also be noted that a type of information recording medium may be employed in which a recording layer owns another function of a photo-conductor layer, or an electric resistance value of a recording layer is decreased in response with a temperature increase. This information recording medium corresponds to an information recording medium which is of a type of a chalcogenide material such as Ge—Sb—Te and an organic conductive material such as polythiophene, both of which decrease the electric resistance caused by temperature increase. In the case that an electro-chromic layer corresponds to a photo-conductor layer, not only the advancing effect as to the recording operation can be achieved, but also the advancing effect as to either the coloring or de-coloring operation caused by previously irradiating the laser beams of the array laser.

Within the first electrode and the second electrode, it is desirable that at least any one of these electrodes is subdivided into a plurality of electrodes. When any one of these electrodes is subdivided in a radial form, the divided electrodes may be readily adapted to the CAV (Constant Angular Velocity) recording operation, and since the capacitance between the divided electrodes can be small, the response speed can be improved.

While an electrode is provided so that it penetrates through an inner circumferential portion of a base plate having at least a single plane of a recording medium, this electrode assumes the role of electrically connecting the respective electrodes formed on the disk to the respective electrodes formed on the rotation shaft.

As an apparatus, a plurality of electrodes are arranged on a portion of a disk receiving component, which is contacted to a disk-sided electrode, while this disk receiving component is mounted on either a rotation shaft of a disk rotating motor or the rotation shaft. Then, such a means is provided in which a rotation shaft-sided electrode is contacted with the disk-sided electrode when the disk is loaded. As a result, predetermined voltages can be applied to the respective electrodes.

In accordance with the present invention, information may be recorded with respect to the above-explained multilayer recording medium by employing a laser light source, for example, an array laser in which a plurality of substantially parallel laser beams for forming a plurality of optical spots are generated from a plurality of generating sources arranged along a substantially straight line. The focal points of the respective laser beams emitted from the array laser may be preferably located on the separated layers. More specifically, these focal points may be arranged on the layers which are sequentially located adjacent to each other. The present invention may achieve the effect in the case of a recording density (track pitch and bit pitch) higher than or equal to the technical specification of 2.6 GB DVD-RAM, and can achieve a specific effect in the case of such recording density higher than, or equal to 4.7 GB DVD-RAM. In such a case that a wavelength of a light source is not present in the vicinity of 660 nm, or a numerical aperture (NA) of a condenser lens is not equal to 0.6, the present invention may achieve an effect in the case of such a recording density higher than or equal to recording density calculated by converting a wavelength ratio and an NA ratio along both a radial direction and a circumferential direction.

In this patent specification, a portion formed as a trench in a concave portion of a base plate is referred to as a "groove." A portion between one groove and another groove is referred to as a "land." When the light passes through the base plate and then is entered into a film, the groove may be observed as a convex, as viewed from the light incident side. As a consequence, even in the system that the light is entered from an opposite side with respect to a base plate, a side which is similarly observed as a convex as viewed from the light incident side may be referred to as a "groove." This portion corresponds to a convex portion when an attention is paid to only the base plate, and thus, is equal to a land portion between one groove and another groove. Therefore, this calling method owns an inverse sense with respect to the definition of the present invention. In a case that information is recorded only on any one of a land and a groove, a so-called "in-groove recording method", a better recording characteristic may be obtained when information is recorded on a convex portion as viewed from the light incident side in a case that the light is entered from the base plate side, and also, in a case that the light is entered from the opposite side with respect to the base plate. However, since there is no large difference between these two cases, the information may be alternatively recorded on a concave portion, as viewed from the light incident side.

In this patent specification, such a term of "phase change" is used, assuming now that this "phase change" may involve not only a phase change occurred between crystal and amorphous, but also another phase change occurred between melting (change into liquid phase) and recrystalization, and another phase change between a crystal state and another crystal state.

A definition as to "electro-chromic material of present invention owns conductivity" is made by that when a 2 volts is applied between a first electrode and a second electrode of a disk whose diameter is large than or equal to 80 mm, a current higher than or equal to 0.1 mA may flow under stationary condition.

In an information recording/reproducing apparatus, an information recording/reproducing medium, and an information recording/reproducing method, according to the present invention, since a plurality of laser beams are collected to the respective layers of a multilayer recording medium respectively, high speed recording/reproducing effects can be achieved. Since the disk rotation speed need not be extremely increased, stable high speed recording operation is carried out. The multilayer recording medium is adaptable for simultaneously recording plural channel information of a television system in a parallel mode.

Other objects, features and advantages of the invention will become apparent from the following description of the embodiments of the invention taken in conjunction with the accompanying drawings.

DETAILED DESCRIPTION OF THE EMBODIMENTS

Structure/Manufacturing Method

Figure 1:
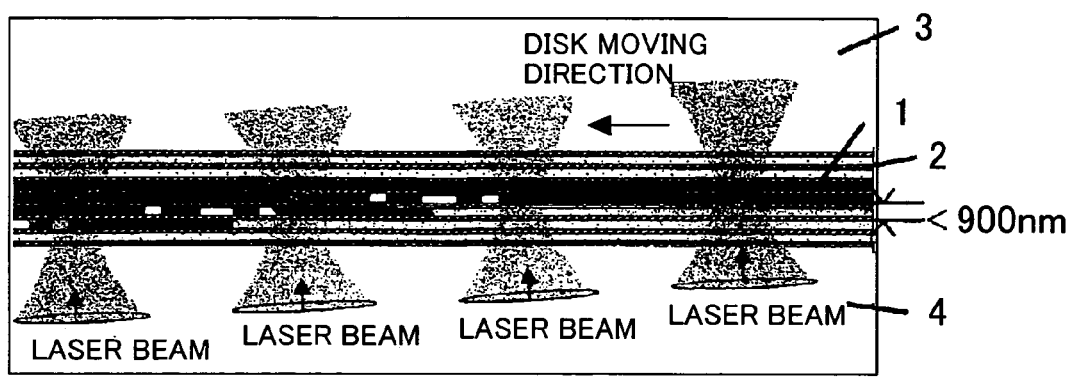
FIG. 1 is a diagram illustratively showing a positional relationship between a plurality of laser beams and respective layers of an information recording medium according to an embodiment of the present invention.

FIG. 1 shows a relationship between an information recording medium according to a first embodiment of the present invention and an optical spot group which is formed by an array laser as a light source. An optical head, a mounting angle of the array laser corresponding to a portion of this optical head and a position of a lens, are adjusted in such a manner that focal positions of the respective laser beams are coincident with the respective layers of the information recording medium. It should be noted that in this drawing, reference numeral 1 denotes a recording layer, 2 denotes a transparent electrode layer, 3 denotes a base plate, and 4 denotes a laminated base plate.

This information recording medium was manufactured in accordance with the following manufacturing manner. First, a polycarbonate substrate (base plate) having 12 cm in diameter and 0.6 mm in thickness was employed, the surface of which owned a tracking-purpose groove (width is 0.615 µm) used to record a land/groove. A track pitch of this land groove was 0.615 µm and a depth thereof was 70 nm. One track of the tracking-purpose groove was divided into a plurality of sectors, a beginning portion of each of the sectors owned a header portion in which an address, a synchronization signal, and the like were represented by a pit string, and a clock was expressed by wobbling the groove. This polycarbonate base plate is substantially identical to a base plate of a DVD-RAM.

Figure 2:
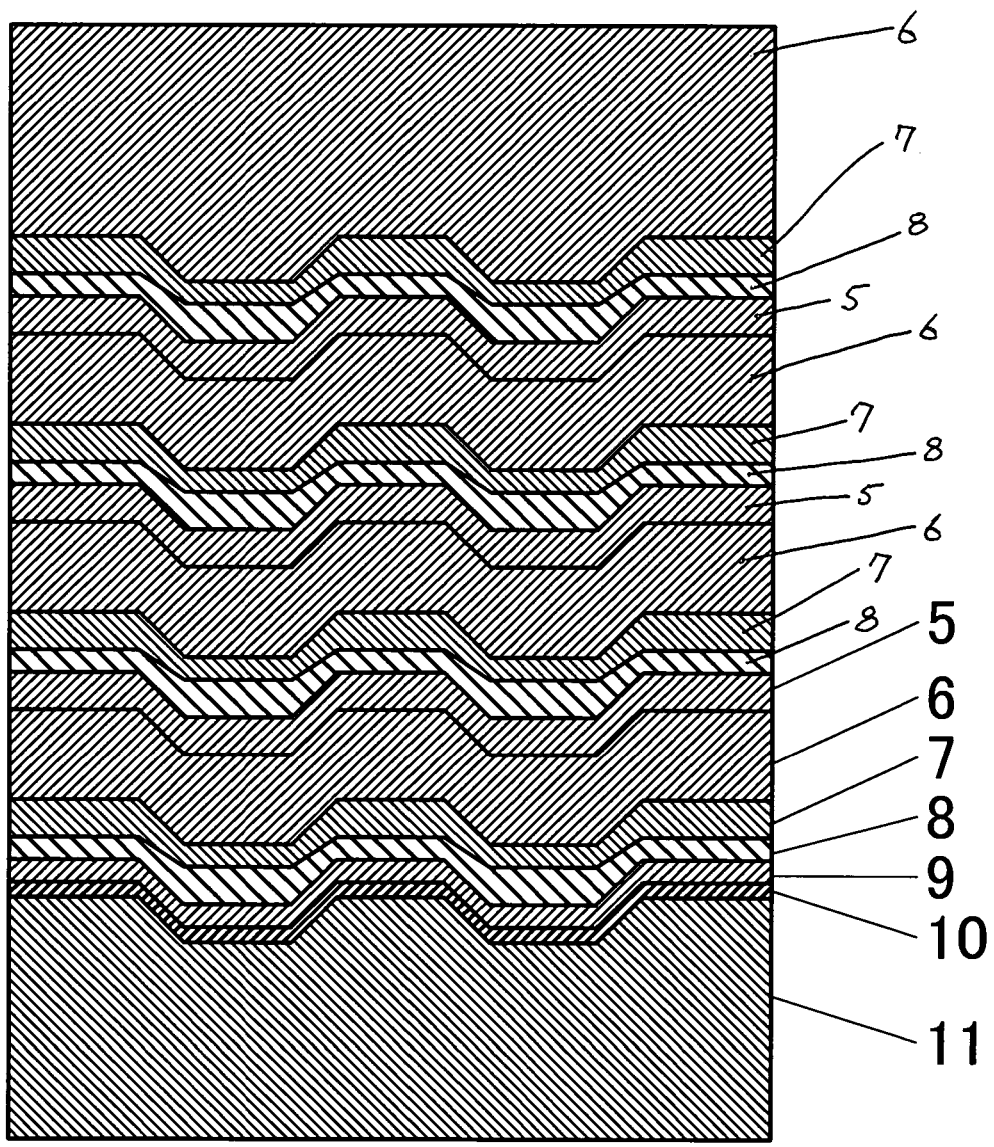
FIG. 2 shows a sectional view of a stacked layer film of the information recording/reproducing medium according to the embodiment of the present invention.

As indicated in FIG. 2, four layers were stacked on the above-described polycarbonate substrate (base plate) 11. Four recording layers were stacked, both sides of which were sandwiched by ITO transparent electrodes 5 in this order of an $Ag_4Pd_4Cu_2$ semi-transparent reflection layer 10 having a film thickness of 20 nm, an ITO transparent electrode 9 having a thickness of 100 nm, an electro-chromic material layer 8 having a thickness of 100 nm, a solid electrolyte layer 7 having a thickness of 100 nm, a $WO_3$ protective layer 6 having a thickness of 300 nm, and an ITO transparent electrode 5 having a thickness of 100 nm were stacked on the polycarbonate base plate 11; an electro-chromic material layer 8, a solid electrolyte layer 7, a $WO_3$ protective layer 6, and an ITO transparent electrode 5; an electro0chromic material layer 8, a solid electrolyte layer 7, a $WO_3$ protective layer 6, and an ITO transparent electrode 5; and further, an electro-chromic material layer 8, a solid electrolyte layer 7, a $WO_3$ protective layer 6, and an ITO transparent electrode 5. Furthermore, another base plate having an inner diameter (or diameter) of 15 mm and an outer diameter of 40 mm, through which an electrode has penetrated, was laminated on an inner circumferential portion of the 4-layer stacked base plate, and a polycarbonate base plate 11 having an inner diameter of approximately 40 mm, an outer diameter of 120 mm, and a thickness of 0.6 mm was laminated on an outer circumferential portion of the 4-layer stacked base plate. Light was entered from the side of this laminated base plate 4. Alternatively, the light may be entered from the side of the polycarbonate base plate 11 so as to record/reproduce. The ITO transparent electrode 5 was formed by way of a sputtering method, and the $WO_3$ protective layer 6 was manufactured by way of a vapor deposition method. The person why this vapor deposition method is carried out is given as follows: That is, in the case that the layer located under this $WO_3$ protective layer 6 is made of an organic material, this layer is protected from an ion bombardment when the sputtering method is carried out. When an influence caused by either the ion bombardment or the oxygen ion is given, an insulating layer was formed and a drive voltage was increased higher than, or equal to 10 volts. It is preferable to form the $WO_3$ layer 6, the thickness of which is thin (on the order of 30 nm) in view of transmittance thereof. To achieve a protection purpose, the known transparent conductive inorganic material may be employed instead of $WO_3$, while this known transparent conductive inorganic material can be formed by executing a vacuum vapor deposition operation, a coating operation or a sputtering operation using only Ar to which either completely no or substantially no oxygen is added. The $WO_3$ protective layer 6 is not employed as the protective layer, or may be employed as an autofocusing and/or tracking and/or reproducing optical reflection layer. This is because this $WO_3$ protective layer 6 may be readily colored by applying thereto a voltage, and reflectance thereof may be readily increased. In such a case where this $WO_3$ protective layer 6 is employed as the optical reflection layer, the optical reflection layers are not added to all of the recording layers, but may be provided every plural recording layers, for example, every one recording layer, every two recording layers. The optical reflection layer may be preferably added to such a layer to which concave/convex of a groove have been transferred. In such a case, a servo signal is acquired from a laser beam which is focused onto the optical reflection layer, whereas a reproduction signal is acquired from a layer beam which is focused onto the same layer, or another layer. In the case that the $WO_3$ protective layer 6 was made thin, a period from the above-described ITO transparent electrode 5 to another ITO transparent electrode 5 was approximately 0.45 μm. As to this period, a range layer than, or equal to 0.1 μm was required in order to prevent a change of recording states due to thermal diffusion to adjoining layers. A range smaller than or equal to 15 μm was required in order that an optical problem does not occur. In this optical problem, the lens collides against the base plate, and the lens owns aberration. A more preferable range was larger than or equal to 0.2 μm and smaller than or equal to 2 μm. If the range is smaller than equal to 2 μm, then no optical problem occurs even when a one-chip array laser is directly employed without widening an interval of laser elements.

Each of the recording layers may be constructed of three layers by adding another layer on the solid electrolyte layer 7. In the case of such a three-layer construction, for example, either an $IrO_x$ or $NiO_x$ ("x" is a positive number smaller than 1) layer having a thickness of 150 nm corresponding to an oxidizing color developing type first color development layer, a $Ta_2O_5$ layer having a thickness of 300 nm corresponding to the solid electrolytic layer 7, and the $WO_3$ layer 6 having a thickness of 200 nm corresponding to a reducing light developing type second light development layer are constructed. Alternatively, the solid electrolyte layer 7 may alternatively be sandwiched by employing both an oxidizing light emitting type organic material and a reducing light emitting type organic material, which are known in the technical field. Also, in the case of the two-layer construction, for example, an OH ion storage layer having a thickness of 200 nm and made of $Cr_2O_3$ and a color developing material layer having a thickness of 200 nm and made of $IrO_x$ are employed. It should also be understood that a metal electrode such as W—Ti may be alternatively employed instead of the ITO transparent electrode 5 which is located at the farthest position from the light incident side. In the case that the electro-chromic material layer 8 is formed by way of a coating method, grooves are gradually embedded by stacking layers, and as to a distance between both electrodes located on both sides of a recording layer, a land portion is located closer than a groove portion.

As a material used for the electro-chromic material layer 8, such an organic material as oligomer or polymer of thiophene-derivatives is preferably used. In particular, a conductive organic material may be preferably used. For instance, in the case of polymer of thiophene such as polyetylenedioxythiophene, the wavelength of the laser was selected to be 660 nm. The polymer of thiophene is formed by way of a coating method, a vacuum vapor deposition method, or an electrolyte polymerization method. In the electrolyte polymerization, poly(3-methylthiophene) corresponding to thiophene-derivatives is employed as monomer; $LiBF_4$ is employed as a supporting electrolyte; and benzonytrile is employed as a solvent. On the other hand, when polyaniline is employed, a large reproduction signal may be obtained by a blue-color laser having a wavelength near 400 nm.

As the layer structure, two layers of the solid electrolyte layer 7 and a layer of PEDT/PSS are employed. This solid electrolyte layer 7 is made of a material by mixing Li triflate (formal name "Li trifluorometanesulfonate": $CF_3SO_3Li$) and plasticizer into acrylic-derivatives ultraviolet-hardening resin. The PEDT/PSS layer corresponds to an electron activated conductive polymer color-developing material layer which is made of a mixture material by mixing poly(3,4etylenedioxythiophone) with poly (styrene culfonate).

As another example of the layer structure, three layers of an ion storage/dark-current blocking layer, the solid electrolyte layer 7 and a layer of PEDT/PSS, are employed among the materials and the layer structures which are described as the coloring control window glass material in "electrochnomic Window Based on conducting poly(3,4-ethylenedioxythiophone)-poly (styrene sulfonate)" written by Helmut W. Hewer et. al. Advanced Functional Materials volume 12, No. 2, pages 89 to 94 (February 2002). The ion storage/dark-current blocking layer is made of $(CeO_2)_{67}(TiO_2)_{33}$. The electrolyte layer is made of Li triflate (formal name "Li trifluoromethansulfonate": $CF_3SO_3Li$) The PEDT/PSS layer corresponds to an electron activated conductive polymer color-developing material layer which is made of a mixture material by mixing poly(3,4etylenedioxythiophone) with poly (stylene sulfonate). Before the thiophene-derivatives polymer layer is formed, if a process operation for adding any one of a cyano group (—NC), a thiol group (—SH), and an S-acetyle group (—SAC) to the edge portion of the thiophene-derivatives polymer is carried out, then a better treatment can be carried out. This is because the longitudinal direction of the thiophene-derivatives polymer is directed to the film thickness direction, so that the current along the film thickness direction may readily flow. As the organic electrolyte layer, polyethylenoxide-thiocyaneoxide potassium-derivatives may be preferably employed.

Instead of the above-described PEDT/PSS layer, when Star-branched poly (3,4-ethylenedioxythiophene-didodecyloxybenzene) (abbreviated as "SPEB") is employed, color developing and de-coloring become fast, and thus, a better characteristic can be obtained. This SPEB corresponds to the polythiophene-derivatives polymer material which develops electrochromic color described in the thesis "Eelectrochromic Linear and Star-branched poly(3,4-ethylenedioxy thiophene-diodedecryloxybenzene) Polymers "written by Fei Wang et al., Micromolecules vol. 33, pages 2083 to 2091 (2000). The above-described electrolyte is used as an electrolyte.

Both the electrolyte layer and the electron activated conductive polymer color developing material layer are formed by field-polymerizing a thiophene-series polymer layer. For example, since such a dopant as Li triflate is captured into a film, these layers may be formed as a single layer. Merits achieved in the case that such an organic material layer is employed are given as follows: That is, since these layers may have an electric conductive characteristic and a photo-conductivity and also a conductivity is increased in connection with an increase of a temperature, photocarriers are accelerated by an electric field, so that coloring can be advanced due to the temperature increase, and the recording sensitivity can be increased. Also, a water component need not be entered/derived into a film in coloring/de-coloring operations such as $WO_3$. A coloring effect occurs in such a way that since electrons are captured in molecules, polarons caused by positive electron charges disappear and molecules can be brought into excitation states by light. To assist this electron mobility ions such as Li are moved. Preferably, either a monomer or a material having a low molecular weight in which several molecules are merely coupled to each other, is processed by a high speed vacuum vapor depositing method, so that the processed polymer may become either an oligomer or a polymer on the base plate. In order to form either the oligomer or the polymer on the base plate, either blue light or near-ultraviolet light is irradiated to the monomer during vacuum vapor deposition so as to bring molecules into the exultation states. While polymers of thiophene derivatives (abbreviated as "polythophene") may be employed, metal phtarocyanine such as Lu-di-phthalo-cyanine, heptyl-biorogene, and tungsten oxalic acid complex may be employed. Also, 3,3 di-methyle-2-(P-di-methyleamino-styrile) indoline [2,1-b] oxazoline (IRPOM) (wavelength of light source being 5145 nm), and 3,3 di-methyle-2-(P-di-methyle-amino-synnamilidene-vinyl) indolino [2,1-b]oxazoline may be used which correspond to styrile derivatives. Also, a stacked layer film made by stacking polyaniline and poly(2-acrylic-amino-methane-2-propane-sulfonic acid (abbreviated as "PANPS")) may be employed as blue laser recording/reproducing operations. This stacked layer film is described in the thesis of "Advanced Materials" written by D. De longchamp and P. T. Hammond, Vol. 13, No. 19, page 1455 (2001).

Furthermore, in order to have a photoconductive effect, a layer of TCNQ (7,7,8,8-Tetracyanoquinodimethane) may be formed. Even when these organic materials are employed, other portions of a disk are made similar to those of the above-described embodiment.

As an inorganic material for substituting $WO_3$, prucian-blue $(K_xFe^{11}yFe^{111}z(CN)_6$ corresponding to a cyanide of iron) $MoO_3$, $Nb_2O_5$, $V_2O_5$, $TiO_2$, $NiOOH$, $CoOOH$, $Rh_2O_3$, $IrO_x$ ("x" is positive number smaller than 1), $ZrNCl$, $InN$, $SnN_x$ ("x" is positive number smaller than 1), $MnO_x$ ("x" is positive number smaller than 2), $WO_3$—$MoO_3$ composite (mixed) thin-film, and the like may be utilized. These materials may be employed instead of $WO_3$ of the protective layer.

In an electro-chromic material, when such a metal as Li and such a positive ion as hydrogen are moved from a predetermined place by a current, or substantially all of electrons brought into a ground state within an optical spot are excited, since an optical absorption is automatically reduced and the current can hardly flow, the following phenomenon can be prevented: That is, a large current may flow through an entire area of a disk, and an excessive large current may flow through an optical spot irradiated portion, so that a recorded mark becomes excessively large. In other words, as a phenomenon, when light is irradiated while a voltage is applied between a first electrode and a second electrode, a current in the vicinity of a place where the light is irradiated is increased. In the case that the voltage is continuously applied even after the light has been irradiated, a current is lowered after a predetermined time has elapsed, and then a state change of a recording layer (electro-chromic layer etc.) is monitored. There is another case that a current is automatically lowered while light is irradiated.

Instead of the electro-chromic layer 8, such a mixture material made by mixing an electroluminescent (EL) material with a photo-chromic material may be employed. Since light is emitted by the EL material, a color of this photo-chromic material is changed, and an optical absorption may occur with respect to a wavelength of either recording light or reading light. As the above-described EL material, such an inorganic material as ZnO and an organic material may be employed. As to this organic material, for instance, among the organic EL materials which are described in the descriptions of Toyota central research laboratory R&D Review Vol. 33, No. 2 (June, 1998), pages 3 to 22, such an organic EL material whose light-emission wavelength is adapted so as to discolor such photo-chromic materials as di-acryle ethene and filgide may be combined with this photo-chromic material so as to be used. In such a case that these organic materials are used to form the layers, these layers are formed by way of the vacuum vapor deposition method, the gas phase crystal growth method, the coating method, and the like. When the coating method was carried out, these organic materials were sufficiently diluted by a solvent in order that a film thickness difference between a groove portion and an intermediate portion of adjoining grooves does not become excessively large. An organic EL material is made of either an electron transfer layer material or a hole transfer layer material and a light emitting layer material, and further, a doping material is such a case that an efficiency is wanted to be improved. While as the hole transfer layer material, starburst amine (m-MTDATA) having a film thickness of 60 nm is employed in which triphenyl-amine is formed as star-molecule, and as the light emitting layer material, a benzo-oxazole Zn complex (Zn(BOX)2) having a film thickness of 40 nm is employed, blue light is emitted.

As the photo-chromic material, flgide, di-allylethene and the like may be used. When flgide is employed, since absorption occurs in the vicinity of a wavelength of 500 nm by irradiating blue-color light, information may be recorded by employing a Kr laser having a wavelength of 514.5 nm.

An overcoat layer made of ultraviolet hardening resin was formed on the above-described stacked layer firm, and then, this overcoat layer was laminated on another base plate.

While laser light is irradiated, if a voltage is applied to transparent electrodes located on both sides of such a recording layer which is wanted to be recorded or read out, then only this recording layer is colored and the irradiated laser light is absorbed/reflected, so that information may be selectively recorded and/or read out. An application of a voltage need not always be limited only one recording layer. Alternatively, in such a case that information is simultaneously recorded on a plurality of recording layers by employing an array laser, voltages are applied between electrodes of plural pairs. Also, while a voltage applied between electrodes of a recording layer which is not recorded was set to a lower plus value on the side of the solid electrolyte layer 7, if a voltage was intermittently to the respective layers in a sequel manner, then it can avoid that lengthy time was required for coloring in response to a capacity between electrodes and a response speed of a material to be colored. Also, in the case that a colored recording layer was achromatized, a reverse voltage was applied.

A recording operation is carried out by way of effects of laser light and/or a current so as to deactivate an electro-chromic effect of a film in such a manner that even when a voltage is applied to the film, a color is not developed, or the film owns an absorption spectrum which is different from that owned before a recording operation. Either coloring speed or de-coloring speed may be alternatively delayed, or the electro-chromic effect may be alternatively deactivated by at least partially solving, or polymerizing either an organic conductive material layer or the solid electrolyte layer 7. In such a case that an easily-crystallized material such as polyacetylene and $WO_3$ is employed in the electro-chromic layer, the electro-chromic effect may be deactivated, and either coloring speed or de-coloring speed may be delayed due to a phase change (amorphous-crystalization, and crystalization). In the case of the phase change, although an erasing speed is slow by irradiating continuous light, information may be re-writable. Conversely, since color development is advanced, information may be recorded. However, when a reverse voltage is applied, a state of a recorded portion must be made optically identical to a state of a non-recorded portion, so that the recorded information cannot be seen. As another method, either an organic material layer or an inorganic material layer may be stacked as another layer, and thus, a recording operation may be alternatively carried out due to a change of this layer, while at least any one of a refractive index and an extinction coefficient is changed due to a physical change (phase change etc.) caused by either heat or a current, or due to a chemical change (for instance, reaction with Li ion). For example, when a chemical composition of $In_{50}Se_{45}Tl_5$ is employed as an inorganic phase change recording film, since transmittance of this organic phase change recording film becomes high with respect to either light having a wavelength of 780 nm or light having a wavelength of 660 nm, especially, light having a wavelength of 780 nm, this recording film is preferably employed. When a recording operation is carried out, the disk is indirectly heated by the optical absorption of the electro-chromic material layer 8. Although there is a large, or small magnitude of photoconductive characteristic, the electro-chromic material layer 8 may own such a photoconductive characteristic, so that electrons contained in the photocarriers may be absorbed by electro-chromic material molecules, and coloration may be accelerated. Conversely, de-coloration may be accelerated, and either coloration or de-coloration may be accelerated by heat produced by a current. An effect may also be achieved. In the case that the phase change recording layer is provided, the recording layer many cause a phase change of either crystallization or amorphous crystallization due to heating operation. Since an optical design is made in such a manner that a change in refractive index caused by the phase change may be especially observed as a reflectance difference when the electro-chromic layer 8 is colored, the respective recording films of the multi-layer may be substantially independently read out. If the optical film thickness defined from the ITO transparent electrode 5 up to the ITO transparent electrode 5 may be designed so as to become nearly equal to 1 wavelength with respect to a wavelength of readout light, then this disk is preferable since any of these recording layers optically become equivalent to each other.

Alternatively, since voltages are applied to a plurality of layers at the same time, or in a sequential manner, these plural layers may develop colors during a recording operation and/or a reproducing operation. Alternatively, the thickness of each layers defined from the ITO transparent electrode 5 up to the ITO transparent electrode 5 may be selected to be such the thickness equal to an approximately focal depth of a focusing lens, and thus, a color may be developed in such a manner that an optical absorption coefficient at a depth layer may become larger. Such a fact that distributions of optical absorption coefficients of the respective layers can be changed when the recording operation is carried out, and the reproducing operation is performed may also constitute the features of the present invention. If the concentration of the electro-chromic materials of the respective layers and the color developing voltage applying time to the respective layers are changed during the recording operation in such a manner that optical absorption coefficients measured in a single layer become 20%, 30%, 40%, and 50% from the light incident side, namely become larger at depth layers, and also, if the optical absorption coefficients of the any layers are uniformly 20% during the reproducing operation, then the above-explained setting conditions are convenient since the information of the respective layers is uniformly contained in such a light which has been reflected from an Ag—Pd—Cu reflection layer.

If all of the stacked layers are subdivided into several layer groups and the electro-chromic layers 8 belonging to the same layer group develop colors and decolorize at the same time, time durations required for the coloring operations and the de-coloring operations can be shortened. For instance, in this embodiment, if the 4 layers are subdivided into two sets of 2-layer groups and the electro-chromic layers 8 belonging to each of the 2-layer groups develop colors and decolorize at the same time, then time durations required for the coloring operation and the de-coloring operation can be shortened. As explained above, if the voltage is adjusted in such a manner that the optical absorption coefficient at the layer located far from the light incident side becomes higher and the diluting degree in the acrylic-derivatives polymer of the electro-chromic material is adjusted within the same layer group, then better recording characteristics are obtained.

As another method capable of not causing that time durations required for coloring operation and de-coloring operation may restrict recording/reproducing speeds, the following method is effective. That is, colors are sequentially developed from the depth layer as viewed from the light incident side, whereas colors are sequentially decolorized from the front layer as viewed from the light incident side. When such a method is employed, while one layer develops a color, voltages may be commenced to be applied to adjoining layers, so that these adjoining layers may prepare color development which may achieve speed-up effect.

In a compact recording medium in which a large sheet resistance does not cause a serious problem, the ITO transparent electrode 5 may be also formed by such a conductive polymer as polyacetylene and polythiophene. In this case, the following merits may be obtained. That is, a difference in refractive indexes between the ITO transparent electrode 5 made of this conductive polymer and the electro-chromic layer 8 becomes small, as compared with that of the organic transparent electrode 5, and thus, such an adverse influence of interference caused by light reflected on a boundary can be avoided. As an underlayer, hydrophobic surface processing agent, or silane coupling agent may be employed, or a copper-group element (Cu, Ag, Au) layer having a thinner film thickness defined from 0.5 to 3 nm (average thickness) may be formed.

Furthermore, while the ITO transparent electrodes 5 among the recording layers may be subdivided into two layers and a heat insulating layer may be provided between the two subdivided layers, if this heat insulating layer may also be made of an organic material, then this construction may be optically preferable due to the same reason as explained in above example. The heat insulating layer may have a conductive characteristic. However, if the heat insulating layer has no conductive characteristic, then better heat insulating layer may be obtained. Thus, a large number of materials may be used, for example, an oligomer of acrylic-derivatives, a polymer, and a vacuum-vapor-deposited film of metal phthalocyanine may be used. Alternatively, such an inorganic material as $ZnS-SiO_2$ may be employed.

In addition, conductive organic material layers may be employed, the absorption edges of which are changed by temperature increases caused by a current and a preheating laser beam of the electro-chromic material layer 8.

In such a case that a phase change material layer is employed as a recording layer, since a refractive index of the phase change recording layer is high, the film thickness of the ITO transparent electrode 5 may be preferably selected to have reflection preventing effect in order that reflections occurred on boundary planes can be avoided. Alternatively, spacer layers having thickness of 20 to 40 μm may be sandwiched every several layers of a multilayer recording layer. For example, in the case that an array laser is employed and the spacer layers are sandwiched every 5 layers, a total layer number may be especially and preferably made coincident with a total beam number, or a total beam number-preheating irradiation beam number. A convex/concave pattern which contains at least one of a tracking groove and a tracking pit is transferred from a nickel stumper to a spacer layer, and this transferred convex/concave pattern may be preferably used so as to detect a tracking signal, an address, a clock, a synchronization signal and so on. When such a structure is constituted and a positive voltage is applied, the concave portion is strongly colored and the address signal may be detected. As to this structure, either an electro-chromic material or a solid electrolyte material is thinly coated on the pattern which has been transferred to the spacer layer in order that the thickness of the layer becomes thick at the concave portion and becomes thin at the convex portion, and one layer where both the electro-chromic material layer 8 and the solid electrolyte material layer 7 are left is coated to be sandwiched by the ITO transparent electrode 5. In this alternative case, when two or more layers of these spacer layers are employed, it is preferable to provide an element capable of compensating for spherical aberration in an optical system. Alternatively, the thickness of the laminated base plate 4 may be made thinner, approximately 0.1 mm and NA of the focusing lens may be made large, e.g., 0.85. If the above-described alternative arrangement is employed, then the short most recording mark length and the track pitch may be reduced by approximately ¾.

It should be understood that when a recording layer and a photo-conductive layer are separately constructed as different layers, if a conductive layer (metal layer and transparent electrode layer) is very thinly formed between these separate layers in order to suppress mutual diffusion/reaction, then reliability may be increased when information is repeatedly rewritten. Note that in order that photo-carriers produced in the photo-conductive layer may penetrate through the photo-conductive layer, an average film thickness thereof must be made thicker than or equal to 1 nm and thinner than or equal to 10 nm. Alternatively, such a discontinuous film having a striped shape or a discontinuous film having a meshed shape may be employed. For example, when an electrode layer made of either Al or $W_{80}Ti_{20}$ and having a thickness of 5 nm was provided between the recording layer and the photo-conductive layer, potentials at a boundary plane could be uniformed. When the conductive layer film is provided after the Al layer has been formed as the recording layer by way of the vacuum vapor deposition method and before the transparent electrode is formed by way of the sputtering method, there is such an effect that the organic material can be protected from ion bombardment and adverse influences of oxygen ions.

The ITO transparent electrode 5 may constitute a single electrode over an entire disk, or may be separated into a plurality of fan-shaped transparent electrodes. It should also be noted that when the ITO transparent electrode 5 is separated into the plural fan-shaped transparent electrodes, since a capacitance between the fan-shaped transparent electrodes becomes small, there is an advantage that a voltage quickly rises and falls. In order that both time durations required for coloring and de-coloring operations and currents are defined within a practical range, in particular, the capacitance between the electrodes is desirably smaller than or equal to 0.1 F. However, in order to bring the characteristic of the element into a better state, such a structure that the capacitance between the electrodes becomes larger than, or equal to 0.01 F is preferably constructed. While the ITO transparent electrode 5 is not separated into a plurality of fan-shaped electrodes, the metal electrode located at the depth position as viewed from the light incident side may be alternatively separated. Also, both the upper electrode and the lower electrode may be separated. In this case, the cutting positions of both the upper/lower electrodes may be made consistent with each other, or inconsistent with each other.

Figure 6:
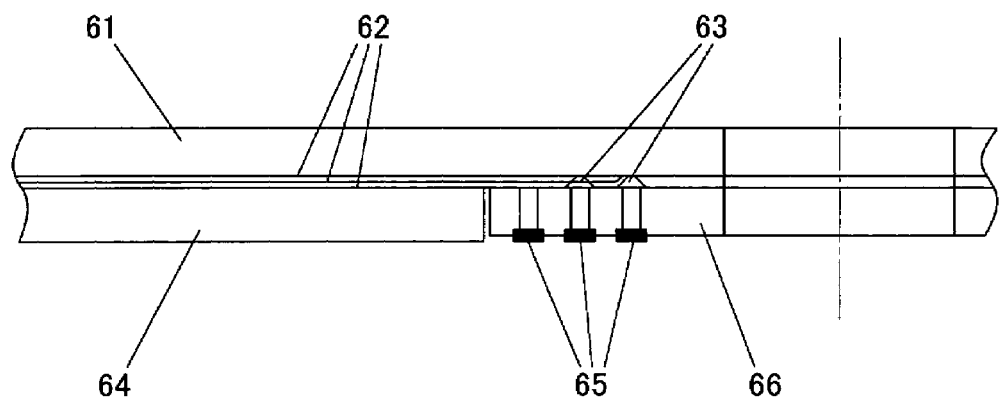
FIG. 6 is a diagram schematically showing a sectional structure of an optical disk according to an embodiment of the present invention.

As shown in FIG. 6, when the respective layers were formed, while an inner circumferential mask was gradually increased, the respective electrodes 62 were exposed to an inner circumferential portion in a coaxial shape. When the respective electrodes 62 are exposed in the coaxial shape, the following points become merits. That is, positioning operation of these electrodes 62 is not required. Also, even when a plane resistance of the ITO transparent electrode 5 is not sufficiently low, a uniform voltage may be applied along the circumferential direction. The inner circumferential portion of the laminated base plate 64 constitutes another base plate 66. This base plate 66 is formed as follows: That is, a plurality of coaxial metal layers 65 corresponding to a total number of the ITO transparent electrodes 5 are formed on both planes of a printed base plate. A metal pin (narrow metal cylinder, or metal wire) penetrates through the printed base plate so as to connect the coaxial electrodes formed on the front surface to the coaxial electrodes formed on the rear surface. A base plate side which is adhered to a base plate 61 having a recording layer is solder-plated on the metal wiring line of the front surface in the normal printed base plate. However, in this case, an In layer 63 has been formed. Since the material of In is soft at a low melting point as being used to fasten a face plate of an imaging tube, if this In material is depressed against the base plate having the recording layer, then this In material is deformed to be adhered to the ITO transparent electrode 5. Instead of this In material, an organic material having a conductivity and elasticity may be employed which is known as a commercially available conductive double-face adhesive tape. Also, a composite material made of such an organic material and a metal may be alternatively used. Furthermore, both the inner circumferential-sided base plate and the outer circumferential-sided base plate having the recording and/or reproducing areas may be formed an integral body, may be adhered to each other or may be separately adhered to counter-sided base plates.

Figure 7:
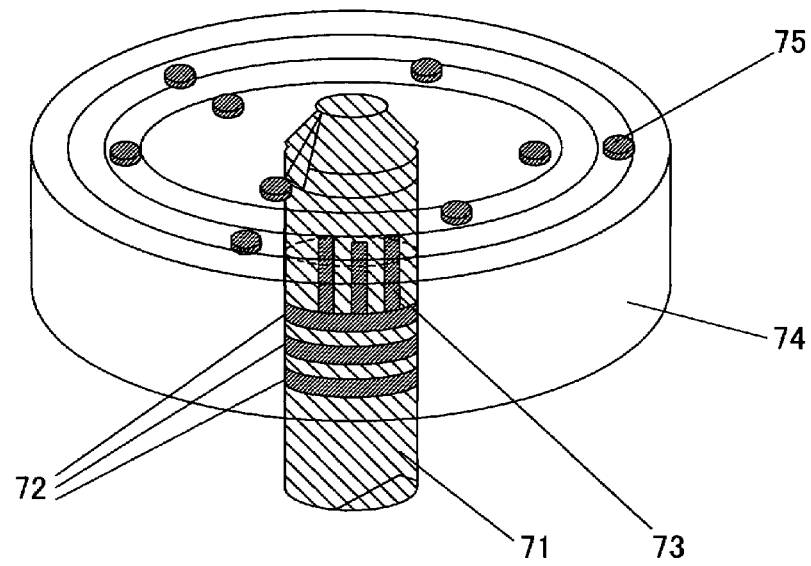
FIG. 7 is a diagram illustratively showing a construction of an upper portion of a disk rotating shaft in the information recording apparatus of the embodiment of the present invention.

As indicated in FIG. 7, at an upper portion of a disk receiving portion (indicated by 32 of FIG. 3) located at an upper portion of a rotation shaft 71 of a disk rotating motor, three sets of pin electrodes 75 are provided with respect to a single coaxial electrode of the disk, while this pin electrode 75 contains a spring which is contacted with a coaxial electrode formed on the front surface of the inner circumferential-sided base plate of the disk. One or two pin electrodes for a coaxial electrode of the disk is also possible. When the disk is put on a disk receiving portion 74, a current may be supplied to the respective electrodes. For the sake of simple explanations in FIG. 7, only the pin electrode 75 corresponding to the three coaxial electrodes is illustrated. It should also be noted that in FIG. 7, a reference numeral 72 shows a slip ring and 73 indicates a wiring line directed toward the upper portion. This wiring line 73 is employed to supply a current to a medium. The pin electrode 75 may be alternatively formed as a cylindrical shape. The inner circumferential-sided base plate may be alternatively formed with the outer circumferential-sided laminated base plate 4 in an integral form. The respective coaxial-shaped electrodes provided on the side of the disk may be subdivided into a plurality of arcs. Alternatively, a plurality of coaxial-shaped electrodes formed on either one plane or both planes of the inner circumferential-sided base plate may be omitted. Since the above-described inner circumferential-sided base plate may be employed so as to manufacture the disk, connections among the respective electrodes can be firmly performed. Durability achieved when a disk is repeatedly mounted/dismounted can become very high. Also, as another method, while drawing electrodes are provided on the respective moistener circumferential portions as to both the reflection layer/electrode and the above-described ITO transparent electrode 5, the drawing electrodes are reached to the disk inner circumferential portions. In order to connect the drawing electrode to separate electrodes on a disk rotation shaft of a recording/reproducing apparatus shown in FIG. 3, these drawing electrodes are connected to either a disk penetrating electrode of the disk laminated base plate 4 or a plurality of electrodes formed on an edge plane of a hole. When a disk is put on the disk receiving portion 74, the respective electrodes of the disk receiving portion 74 on the rotation shaft are directly contacted to the drawing electrodes provided on the disk side, or are contacted to the coaxial-shaped electrodes formed on the front surface side of the laminated base plate 4. Also in this case, there is a merit that as previously explained, positioning of the coaxial-shaped electrodes is no longer required along the disk rotation direction on the front surface side of the base plate.

Figure 3:
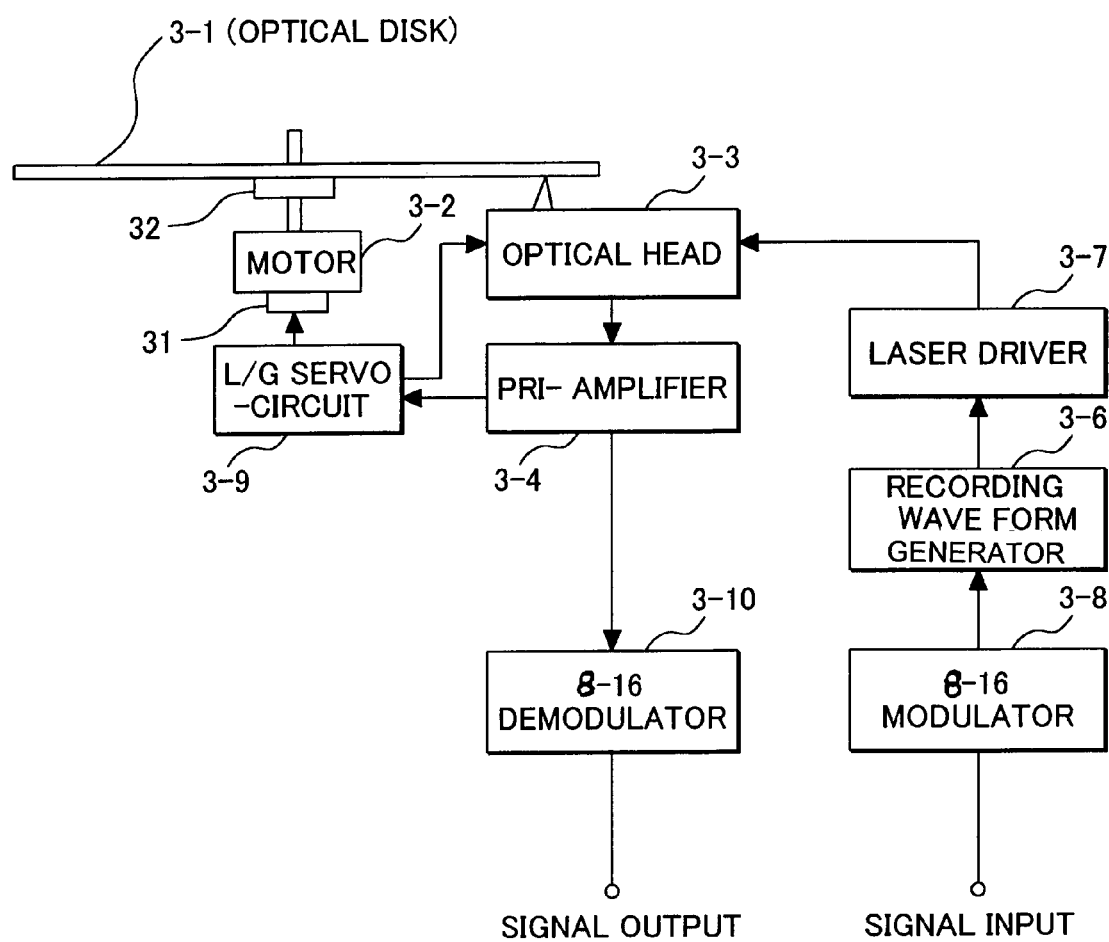
FIG. 3 is a schematic block diagram showing an arrangement of an information recording apparatus according to an embodiment of the present invention.

Six separated electric wires capable of accepting a multilayer disk up to 5 layers are connected to the electrodes of the above-described disk receiving portion (circular plate), while these electric wires penetrate through an area near the surface of the inner portion of the rotation shaft of the disk rotation motor which is connected to the disk receiving portion. Each of these six electric wires is connected to three sets of the above-explained coaxial-shaped pin electrodes 75. Alternatively, 7 sets of these pin electrodes 75 may be provided on a single coaxial circumference. Electric power is supplied to the respective electric wires of the disk rotation shaft from a circuit base plate of the recording/reproducing apparatus by a voltage transfer mechanism (indicated by 31 of FIG. 3) which is arranged by combining a plurality of brushes and a ring. A diameter of a rotation shaft (or outer diameter of ring) of both the brushes and the ring was selected to be 3 mm. The wiring lines 73 derived from the respective slip rings 72 through the rotation shaft toward the disk receiving portion 74. It should be understood that only three sets of the slip rings 72 and only three pieces of the wiring line 73 are illustrated among 6 sets of the slip rings 72 and the wiring lines 73. In the case that the brush and the rings are employed, the rotation shaft of this portion must be thinner as being permitted as possible, preferably, a diameter of this rotation shaft may be smaller than or equal to 5 mm, and more preferably made smaller than or equal to 3 mm. Then, if a linear velocity is decreased, then abrasion can be suppressed, and thus, long lifetime can be achieved. In this case, such a construction is made in order that force other than the rotation direction is not applied to this portion. That is, this construction is made by supporting upper/lower portions (right/left portions when rotation shaft is set along transverse direction) of this portion by way of a bearing. The six brushes may be independently provided every one electrode, or alternatively may be combined with each other to form a single spring plate. In accordance with such a method of combining these six brushes with each other, even when a large number of electrodes (approximately 50 electrodes) is formed, these electrodes may be operated under stable conditions without mutual interference. Instead of the combination between the brushes and the ring, a ball bearing may be employed. Electric conductive grease with which carbon very fine powder has been mixed was filled into this ball bearing so as to improve electric conductivity. As the voltage transfer mechanism (power supply method), other methods may be alternatively employed, i.e., such non-contact methods may be employed, for example, a combination between a solar cell and either a laser or an LED, and another combination between coils located in close proximity to each other. It should also be noted that the voltage transfer mechanism may be provided on the disk side of the disk rotation motor, or may be provided on the opposite side of this disk rotation motor. When the voltage transfer mechanism is provided on the opposite side of this disk rotation motor, since torque is not required, there is such a merit that the shaft may be easily made thinner. However, a space is required under the disk rotation motor. It should be noted that the recording/reproducing apparatus is represented in FIG. 3. In this drawing, a reference numeral 32 shows a disk receiving portion; 3-1 indicates an optical disk; 3-2 shows a motor; 3-3 represents an optical head; 3-4 denotes a preamplifier circuit; 3-6 shows a recording waveform generating circuit; 3-7 indicates a laser drive circuit; 3-8 represents an 8-to-16 modulator (inputted signal is modulated); 3-9 indicates an L/G servo circuit; and 3-10 shows an 8-to-16 demodulator (which demodulates signal to output demodulated signal).

Recording/reproducing laser light was entered from the side of the laminated base plate 4. While the metal reflection layer is not provided on the front surface of the base plate, the convex/concave such as the groove of the transfer layer is provided on the uppermost portion, and the metal reflection layer is provided if necessary, and then, the laser light may be alternatively entered from the side of the base plate.

Recording/Erasing/Reproducing Operations

With respect to the above-described recording medium, information was recorded and reproduced. Referring now to FIG. 3, an information recording and reproducing operation of the present invention will be described below. First, as a motor control method executed when recording/reproducing operations are carried out, the ZCLV (Zoned Constant Linear Velocity) system has been employed, in which a rotation number of a disk is varied every zone where information is recorded and reproduced. In order to uniform effects of preheating operation and effects of preirradiating operation, the ZCLV system was optimum.

ZCLV Recording Method and CAV Recording Method

In the case that a recording waveform is not changed, it is desirable to record in an optimum linear velocity in order to obtain a better recording/reproducing characteristic. However, when recording tracks located at the different radiuses on the optical disk 3-1 are accessed, the rotation number of this optical disk is changed to make linear velocities equal to each other, which requires lengthy time. Under such a circumstance, for example, DVD-RAM has employed the ZCLV (Zoned Constant Linear Velocity) system. In accordance with this ZCLV system, while a radial direction of a disk (DVD-RAM) is subdivided into 24 zones in order that accessing speeds are not slow, a rotation number of the disk within a zone is constant, and the rotation number is changed only when another zone must be accessed. In this ZCLV system, since a linear velocity at the innermost track within a zone is slightly different from a linear velocity at the outermost track within this zone, recording density is also slightly different from each other. However, information can be recorded in the substantially maximum density over the entire disk.

On the other hand, as to such a technical point that even when a track of an optical disk is largely accessed along a radial direction, a rotation number of this optical disk need not be changed, the CAV recording system with constant rotation number is desirable. Also, since power consumption required when a rotation number is changed can be suppressed, this CAV recording system may also suitably be applied to a mobile appliance. As previously explained, since the constant heating time can be obtained irrespective of the position along the radial direction, the present invention can own such an effect that the CAV recording system can be easily employed.

Mark Edge Recording System

For instance, the mark edge recording system capable of realizing high-density recording operation has been employed in both DVD-RAM and DVD-RW. Mark edge recording implies that positions of both edges of a recording mark formed on a recording film correspond to "1" of digital data. As a consequence, a length of the shortest recording mark corresponds not to one piece of a reference clock, but corresponds to 2 to 3 pieces of the reference clocks, so that high density may be realized. While DVD-RAM has employed the 8-to-16 modulation system, the length of the shortest recording mark corresponds to three pieces of these reference clocks. The mark edge recording system owns such an advantage that even when the recording mark is not made extremely small, high density recording can be realized, as compared with the mark position recording system in which a center position of a circular recording mark corresponds to "1" of digital data. It should be noted that in the mark edge recording system, such a condition that a shape distortion of a recording mark is small is required for a recording medium.

In this embodiment, the optical axis including the setting angle of the laser is inclined or effective coming out position from the laser of each beam is changed beam by beam in such a manner that the respective optical spots produced by collecting the multi-beam may have the focus points on the separate layers. As a result, the normal recording operation may be carried out on the respective recording media.

In the case of the conventional phase-change write-once type 4-layer recording medium in the 4-beam simultaneous recording operation, since the interlayer interval is large to prevent the interlayer crosstalk, the optical axis must be largely inclined. Thus, there are such problems that the laser beams can be hardly collected due to aberration, and the lens collides with the disk. For example, in such a case of a layer array, the beam interval of which is 100 μm, if a layer interval is 20 μm, then an inclination angle become ⅕. Also, since each of the layers absorves light, there are some possibilities that recording sensitivities are lowered, and recording speeds are delayed due to a lack of power. However, in the case of the voltage layer selecting system multilayer recording medium, the above-described problems of the phase-change recording medium can be solved. First, if the layer interval is smaller than, or equal to 0.1 μm, the inclination angle is sufficiently small with respect to approximately 100 μm of the beam interval. When it is so assumed that the layer period is selected to be approximately 300 nm, and the beam interval is selected to be approximately 50 μm, some counter measure for aberration, for example, placing a step shaped glass or amorphous-qualts plate in front of the array-layer, should better be applied.

In this embodiment, although the normal one-chip array laser may be employed, it is also preferable that the respective laser chips of the array laser are separated from each other, and these separated laser chips are adhered on a silicon substrate by separating intervals among these laser chips. Since an interval of optical spots becomes substantially equal to ⅛ of a beam interval based upon an NA ratio of a collimator lens (NA being on the order of 0.1) to a focusing lens (condenser lens), such a condition that an interval of laser elements is widened can widen the interval of the optical spots on the disk, and the preheating coloring time by the below-mentioned mechanism can be gained. However, if the beam interval is excessively widened, then such a problem may occur in the case that the laser beams are condensed by a single lens, namely, aberration may occur in laser beams of both edges. Assuming now that a total number of laser beams entered into a single lens is 5, in particular, the beam interval is preferably selected to be shorter than or equal to 50 μm under condition of NA=0.85 and shorter that or equal to 70 μm under condition of NA=0.6 in order to sufficiently suppress the aberration occurred in the beams of both edges to a small aberration value.

Since the voltage layer selecting type multilayer recording medium can record thereon information even when an optical absorption is small, the layers corresponding to the total beam number may be colored to record information. However, in the case that the voltage layer selecting type multilayer recording medium records thereon information in a faster speed, the following control operation is carried out. Firstly, the deepest layer corresponding to a first beam which impinges on the disk in the first preceding irradiation is brought into a slightly colored state by applying a voltage to this deepest layer, and thus, both an auto-focusing operation and a tracking control may be carried out. Even when laser light is irradiated onto the deepest layer, a recording state is not changed. In such a case that it is practically difficult that a recording state of a layer is not changed, this layer may be employed as a dummy layer in which no recording operation is carried out. A laser beam which impinges in the first preceding irradiation is not power-modulated, but is exclusively used as a continuous heating laser beam. The plural layers counted from this layer up to the total beam numbers are not completely located on the focus points, but are present within such a range that optical power density is high. And such a pulse voltage having slightly higher than the voltage used in the normal coloring operation is previously applied to these layers. Otherwise, a voltage is started to be applied to these layers to slightly color these layers at the substantially same time, or at slightly delayed time from the time when the voltage is applied to the deepest layer. And these layers are previously irradiated by irradiating the laser beam for preceding irradiation. Since the coloring operation of the recording medium is accelerated by previously irradiating the laser light and the optical absorption is rapidly increased, a sufficient light absorption amount may be obtained when a second layer from the deepest layer is irradiated by a second laser beam for recording or reading. Since the recording track is a spiral shape, if the second beam is arranged in such a manner that this second beam impinges at the same place on the disk after the disk is rotated several times since the first beam has been irradiated, then the second beam may be irradiated under sufficiently colored state even in such a recording medium which requires a time duration in the unit of ms(millisecond) until this recording medium is sufficiently colored after a pre-irradiation of a laser beam. If beam irradiation is waited until an optical disk is rotated three turns, then waiting time becomes on the order of 0.1 second (correctly speaking, an inverse number of rotation speed per 1 second×3, which is expressed by "rps"). As a result, if such a material may be colored within 1 second by applying only a voltage, then this material may be sufficiently colored by way of the pre-irradiation at one order of coloring acceleration. In other words, a large effect may be achieved if the position difference of adjacent spot is within 3 tracks. In such a case that lengthy waiting time is adapted while the disk is rotated many turns, the effect of the pre-irradiation may be lost, the interval of beam spots is excessively widened, and the laser cost becomes expensive. However, in such a case of a laser array having a pitch of 100 μm, there is a possibility of spot interval becomes 20 μm. For example, assuming now that the track pitch is near equal to 0.6 μm, there is a possibility of pre-irradiation of 33 tracks apart, namely, waiting for 33 turns of the disk. This fact may be similarly applied to a third beam and a fourth beam. As previously explained, recording/reproducing operations are carried out under such a condition that only a target layer has been sufficiently colored. The recording operation was carried out by that the coloring function was lost by heat. Other than the effect of the pre-irradiation, delays occurred in the coloring operation and the de-coloring operation from the inner circumference to the outer circumference due to the plane resistance of the ITO transparent electrode 5 may be utilized. In this case, a time duration of approximately 1 second is consumed in order that a front of the coloring operation, or a front of the de-coloring operation is moved from the innermost circumference up to the outermost circumference of a disk having a diameter of 120 mm thereof. As a consequence, for example, in the case that the rotation speed is 30 rps (revolution per second), the front of the coloring operation and the front of the de-coloring operation are advanced by approximately 1 mm while the disk is rotated by 1 turn. In order to make up a difference between a colored layer and a transparent layer, which are located adjacent to each other on a certain radial point under the above-explained maximum spot interval of 20 μm, it can be understood that a coloring voltage may be started to be applied in an interval of 1/50 seconds.

In the case that a total layer number is larger than a total beam number, information may be similarly recorded in such a manner that a laser beam jumps over plural layers equal to a total beam number in order to record/reproduce the information on/from another layer.

Referring now to FIG. 1, such a mechanism that a coloring operation is accelerated by performing a pre-heating operation and/or pre-irradiation will be described more in detail. To this end, a mechanism of coloring operation must be firstly explained. Each of the recording layers is basically constituted by either two layers or three layers. Layers playing a major role are the solid electrolyte layer 7 and the electro-chromic material layer 8. The solid electrolyte layer 7 was originally an electrolytic solution, and in this embodiment has been solidated. An operation of this solid electrolyte layer 7 may be readily conceived if reminding this layer 7 corresponds to a liquid electrolyte.

Since the electro-chromic layer 8 is brought into a condition that a large number of PEDT molecules are attached to a polymer chain of a polystyrene sulfonic acid (PSS) and the molecular weight of PEDT is smaller than that of PSS, the electro-chromic layer 8 captures electrons from polyethylene-di-oxythiophene molecules to be charged to minus state in correspondence with movement of Li ions along the electrolytic direction, and then ejects the captured electrons to the ITO transparent electrode 5. Plus electric charges are produced in polyethylene-di-oxythiophene, and then, polaron and bipolaron are formed. The molecules where polaron and bipolaron have been formed own substantially no optical absorption of a visible range. Assuming now that the electrode provided on the side of the electrolytic solution is defined as a plus and the electrode provided on the side of the electro-chromic layer 8 is defined as a minus, when a voltage is applied between these electrodes, the Li ions contained in the electrolytic solution are moved to the side of the electro-chromic layer 8 to be collected on a surface of the layer. A partial ions among the Li ions are entered into the electro-chromic layer 8. Since the electrons are injected from the electrode provided on the side of the electro-chromic layer 8, electron density within the electro-chromic material layer 8 is increased, and the electrons are coupled to the positive electric charges of polyethylene-di-ox-ythiophene molecules. As a result, the optical absorption of the visible range occurs, so that coloring operation may occur. A portion of the electrons captured by PSS is attracted by the Li ions, so that the attracted electrons are gone to the electrolytic solution direction.

When light is irradiated in this coloring stage, if photo-carriers are produced and the temperature of the electro-chromic layer 8 is increased, then conductivity of hopping conduction is increased. As a result, electron injection is largely carried out in a high speed, and electrons are produced as the photo-carriers, so that the coloring operation is largely advanced. Utilization of this phenomenon corresponds to pre-irradiation executed by preceding irradiated beams. If there are known such materials having hopping conduction, semiconductive conduction or photo-conductive characteristic, then similar effects may be achieved other than the materials described in this embodiment. Most of inorganic electro-chromic materials own semiconductive conduction and photo-conductive characteristics.

Figure 5:
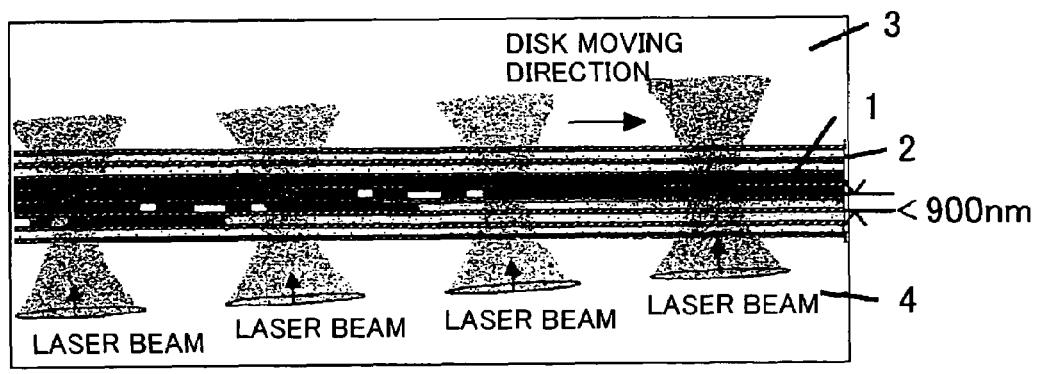
FIG. 5 is a diagram illustratively showing conditions in which decoloration is accelerated by a preheating/pre-irradiating operation of the present invention.

Even in such a case that a color changing speed is insufficiently improved due to an increase of conductivity which is caused by a temperature increase and photo-carriers, a change in absorption edges due to the temperature increase may be utilized as another pre-irradiation effect. Alternatively, both the effects may be utilized. Normally, there are many cases that when a temperature is increased, in an organic polymer, a planar characteristic of molecules cannot be maintained, so that three-dimensional deformation may occur in a time averaging manner, and an optical absorption edge is moved. Because of this effect, either coloring or de-coloring operation may be carried out in higher speed due to the pre-heating effect. There are many cases that as to a change of an absorption edge caused by an increase of a temperature, the absorption edge is moved in a direction along which transmittance is increased in a visible range. This is because probability existed in the ground state is decreased; a flatness characteristic of polymer molecules is lost, so that an absorption is reduced; and molecules whose absorption is decreased by ejecting electrons are increased, as compared with an inverse case. In such a case that an effect that transmittance is increased while a temperature is increased is greater than another effect, a pre-irradiation laser beam may be arranged at a layer located at the nearest position as to the laser beam incident side, and succeeding laser beams may be sequentially focused onto the deep layers. In such a beam arrangement, an effect may also be utilized. That is, transmittance of a recording mark portion is increased by way of recording operation, so that an averaged amount of light to be penetrated through the deep layer is increased. Since the above-explained various sorts of stages are extremely fast as compared with movement of Li ions, either the coloring operation or the de-coloring operation can be carried out in very high speed. The high-speed coloring operations caused by either a photochemical or a physical effect other than the pre-heating effect may be alternatively used. Conversely, such a method that the de-coloring operation is performed at a higher speed by the heating effect may be useful in the case that a recording medium having a particular characteristic is employed, as shown in FIG. 5, a first beam is focused onto the first nearest layer, and the second nearest layer is started to be decolorized. In FIG. 5, a reference numeral 1 shows a recording layer, 2 indicates a transparent electrode layer, 3 represents a base plate, and 4 is a laminated base plate. Even when a de-coloring operation is commenced, since a color is still dark when a second beam impinges, recording/reproducing operations may be readily carried out. However, when a third beam impinges on a layer, this layer is decolorized in order not to give an adverse influence to recording/reproducing operations of two deep layers. For example, a phenomenon in which absorption is attenuated due to absorption saturation may be utilized. In order to achieve the above-described pre-heating effect, in the array laser, a plurality of substantially parallel laser beams are generated from a plurality of beam generating sources (lasers) which are arranged on the substantially same straight line. Even in such a laser array that laser elements are separated and intervals among these separated laser elements are widened, these laser elements may be preferably arranged in a straight shape by utilizing a silicon mono-crystal cleavage plane.

Optical spots are positioned in such a manner that a first optical spot from a first laser beam is irradiated onto a first layer, and after the first optical spot has been irradiated onto the first layer, a second optical spot may be irradiated onto a second layer which is located adjacent to the above-explained first layer with respect to a light incident side, and then information is recorded, or reproduced. When the positioning operation or control operation is carried out with respect to optical spots which are formed onto the respective layers of a multilayer recording medium from a plurality of laser beams in such a manner that the adjoining beams are located on the same track along the radial direction of the base plate, or within 3 tracks, the pre-irradiation effect can be obtained. However, when a positional shift larger than the above-explained positional shift occurs, this pre-irradiation effect may not give an influence to other layers, under which information is insufficiently recorded/reproduced. If the positional shift is defined within a range of the 1 track, there is a merit that information can be substantially and simultaneously commenced to be written from either the innermost circumferential track or the outermost circumferential track.

As previously explained, an operation that a large number of laser beam spots are arranged on either the same track or the tracks located in proximity to each other along the circumferential direction of the disk may achieve advantages. That is, addresses may be easily confirmed, and none of these laser beams is not deviated from either the outermost circumferential track or the innermost circumferential track.

Figure 8:
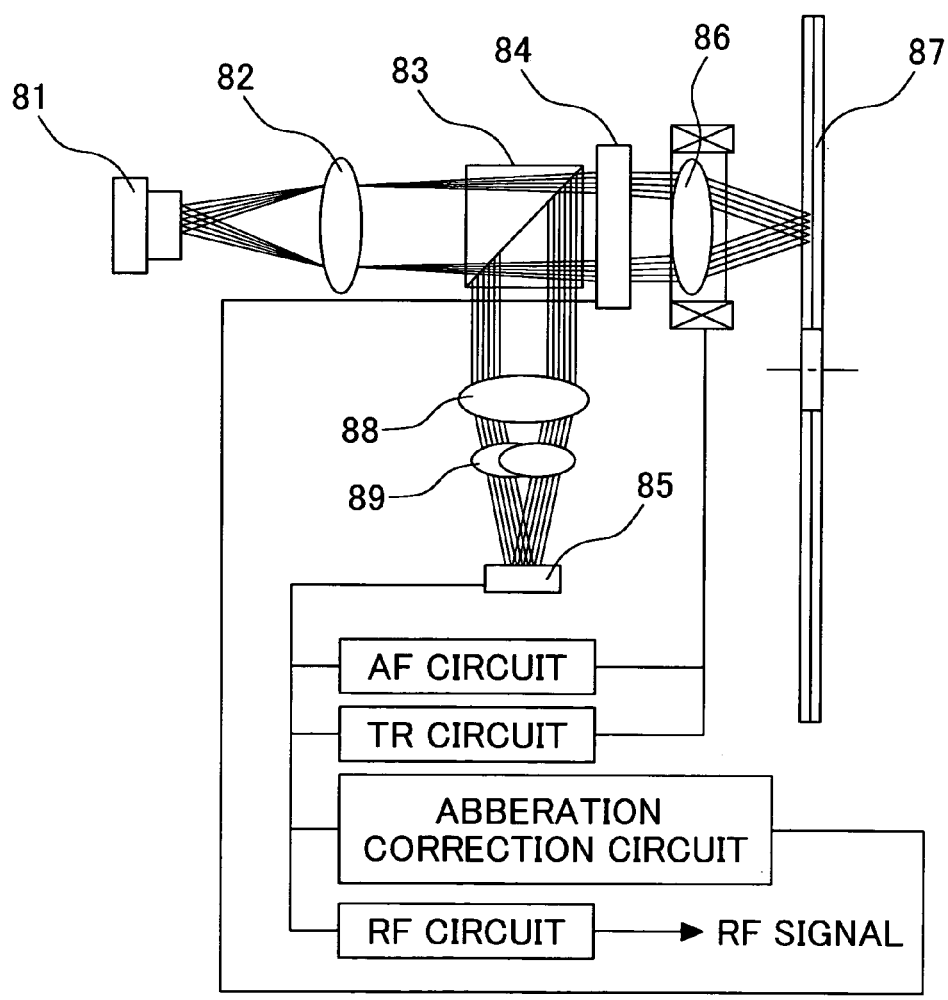
FIG. 8 is a schematic diagram showing both an optical system of an optical head and a reproduction signal detecting means for detecting a tracking error signal and a track address in the information recording apparatus according to the embodiment of the present invention.
Figure 9:
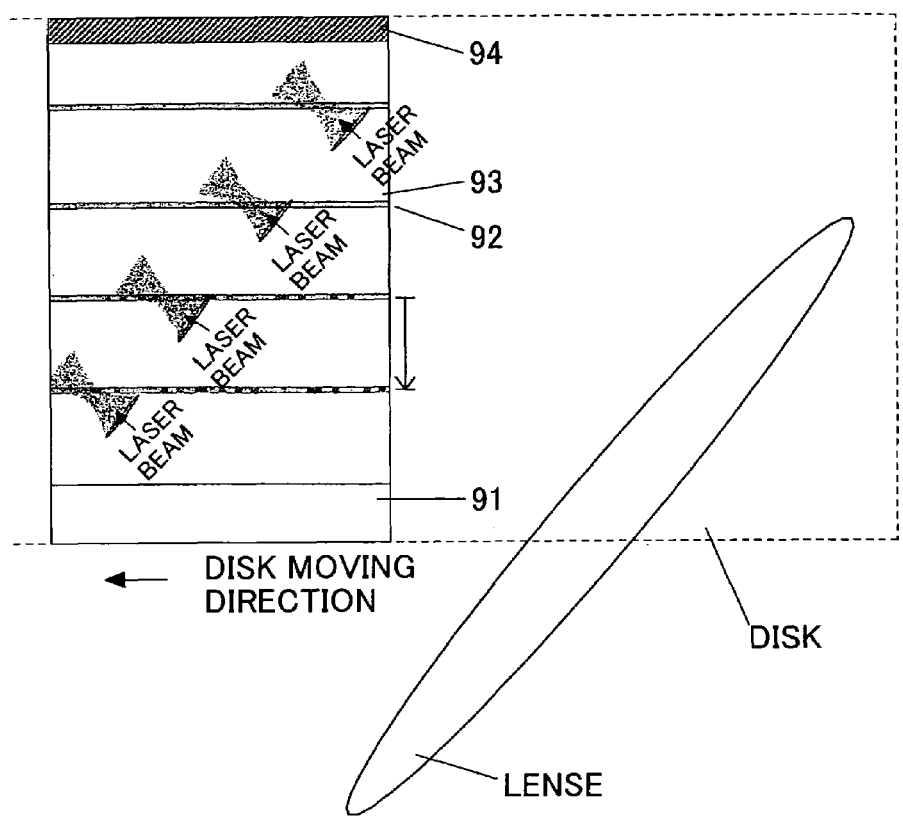
FIG. 9 is a diagram illustratively showing the problem occurred in the multi-layer beam irradiation of the multi-layer disk of the conventional system.

As indicated in FIG. 8, since a means for detecting either a tracking error signal or a tracking address signal by at least two laser beams located near both edges among the above-explained plural laser beams, a positional shift must be detected. It should be understood that FIG. 8 is a diagram for schematically showing a recording/reproducing apparatus with employment of a plurality of laser beams. A reference numeral 81 shows an array laser, 82 indicates a collimator lens, 83 indicates a half prism, 84 denotes a spherical aberration compensating element and 85 represents a 4D detector array. Also, a reference numeral 86 shows a focusing lens, 87 is a detector, 88 indicates a lens and 89 shows a cylindrical lens. A signal detected by the detector array 85 is processed by an RF circuit to output an RF signal, and the RF signal is processed via an AF circuit and a TR circuit to control the position of the focusing lens 86. Also, aberration is compensated by an aberration compensating circuit.

In the above-described multilayer recording medium, information is not recorded in a predetermined time period in order that destruction of a recording state does not occur in a layer to which a preheating optical spot is irradiated. However, preferably, this multilayer recording medium owns a focusing/tracking dedicated layer of preheating/pre-irradiating beam, which can be colored by applying thereto a voltage, and reflectance can be increased.

Figure 4:
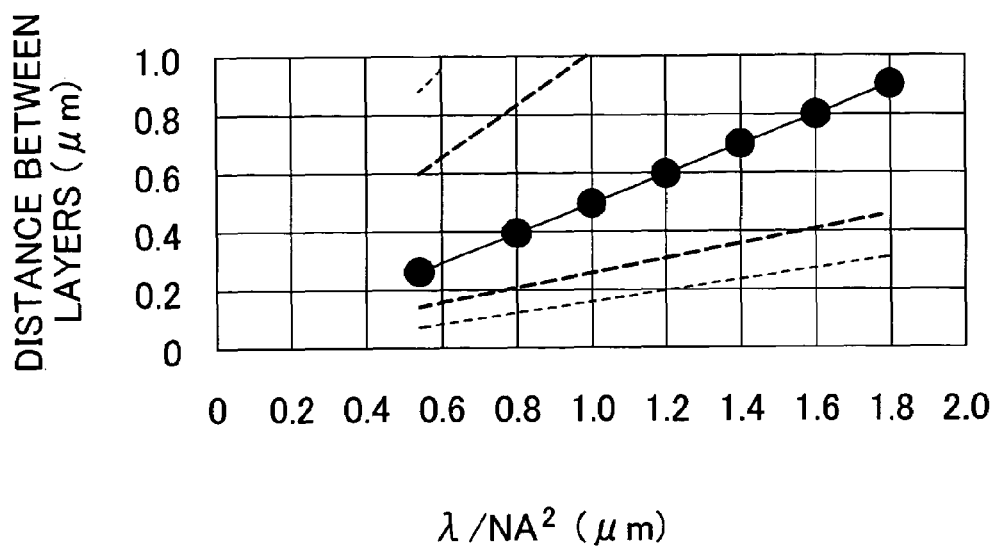
FIG. 4 is a graphic diagram showing a preferable relationship between a period of layers of the information recording medium and a wavelength/NA, which are employed in the information recording apparatus according to the embodiment of the present invention.

FIG. 4 is a diagram for plotting a range capable of achieving effects as to a recording layer period of a multilayer recording medium of the present invention, a wavelength, and NA. As shown in this drawing, in order that a proper laser power density of either a preheating operation or pre-irradiating operation at a layer separated from a focal point, there is a substantially direct proportional relationship between an especially desirable layer period and $\lambda/NA^2$ ("$\lambda$" indicates wavelength of laser, and "NA" is a numerical aperture of focusing lens). However, this relationship may depend on large/small effects of the pre-irradiation. When such an experiment was carried out by changing an amount and a sort of material which was added to polythiophene, as indicated by a narrow dot line in FIG. 4, a range may be arbitrarily defined from ⅓ to 3 times larger than the value of the graph along the longitudinal axial direction, which represents the direct proportional relationship. In other words, if the value is located within the range from ⅓ to 3 times, then either coloring or de-coloring operation advancing effect could be achieved. It should be understood that since an upper range above a line plotted by a black circle corresponds to a direction along which a laser beam is widened and a preheating effect can be hardly achieved, a lower range under the line plotted by the black circle is more preferable. In the case of a recording medium where the de-coloring advancing effect can be achieved, if the reading laser power density is not lower than the pre-irradiation, then contrast is lowered.

Referring now to FIG. 3, operations will be explained. The information supplied from an external source of the recording apparatus is transferred to the 8-to-16 modulator 3-8, while 8 bits thereof are used as 1 unit. When the information was recorded on the optical disk 3-1, the information was recorded by employing a modulation system for converting 8-bit information into 16-bit information, namely a so-called 8-to-16 modulation system. In this modulation system, the information having mark lengths of "3T" to "14T" corresponding to the 8-bit information is recorded. The 8-to-16 modulator 3-8 shown in this drawing performs this modulating operation. In this case, "T" indicates a time period of a clock when the information is recorded. The disk was rotated in such a manner that a relative speed with respect to an optical spot becomes a linear velocity of 15 m/s.

The digital signals of 3T to 14 having been converted by the 8-to-16 modulator 3-8 are distributed to respective beams by a distributing apparatus. Apparently, originally separated signals similar to, for example, picture/audio signals of respective TV channels may be allocated to the respective beams to be parallel-recorded. The recording signals of the respective beams are transferred to the recording waveform generating circuit 3-6, so that multi-path recording waveforms are produced.

In this case, a power level used to form a recording mark was set to 12 mW, and a level of decreased power was set to 0.1 mW. Even when the linear velocity was changed from 8.2 m/s, there was no large change in this range. A reading operation is carried out under a condition that the power level is selected to be 1 mW without applying a voltage.

When information was read out for a long time at a power which exceeds 2 mW, data recorded on the disk was deteriorated. Also, in the above-described waveform generating circuit 3-6, the signals of 3T to 14T alternately correspond to "0" and "1" in a time sequential manner. In this case, an area to which a pulse having a high power level has been irradiated is changed into amorphous (mark portion). Also, the waveform generating circuit 3-6 owns a multi-pulse waveform table corresponding to a system (adaptive type recording waveform control). This system may change a head pulse width and a pulse width of a last pulse within multi-pulse waveforms in response to a length of a space portion before/after a mark portion when a series of high power pulse stream used to form the mark portions are produced. With employment of this multi-pulse waveform table, such a multi-pulse recording waveform is generated which can eliminate an adverse influence caused by mark interval thermal interference occurred among the marks.

The recording waveform produced by the recording waveform generating circuit 3-6 is transferred to the laser drive circuit 3-7, and the laser drive circuit 3-7 then emits a semiconductor laser within the optical head 3-3 based upon this recording waveform.

A semiconductor laser array having an optical wavelength of 660 nm is used as an information recording laser beam in the optical head 3-3 mounted on this recording apparatus. Also, this laser light is focused onto a recording layer of the optical disk 3-1 by an objective lens having a lens NA of 0.65, and information is then recorded thereon by irradiating the laser beam.

In the recording medium of this embodiment, a contrast ratio of approximately 2:1 as to optical reflectance of a recording mark to other portions was obtained. When the contrast ratio becomes lower than or equal to this contrast ratio of 2:1, a fluctuation caused by noise of a reproducing signal exceeds an upper limit value of 9%, which is deviated from a practical quality range of reproducing signals. When $SiO_2$ was contained in the ITO transparent electrode 5 to form $(SiO_2)_{40}(In_2O_3)_{55}(SnO_2)_5$, the refractive index thereof was lowered, resulting in an optical advantage and enabling the contrast ratio to make higher than or equal to 2.5:1.

An erasing operation is carried out in such a manner that an applied voltage is lowered and an amorphous area is crystallized by irradiating the laser light thereto in a continuous manner. Also, in the erasing operation, a pulse laser is irradiated. Alternatively, the pulse wider than any of recording pulses may be repeatedly irradiated to erase the information.

A reproducing operation of recorded information was carried out by employing the above-described optical head. A layer to be reproduced is colored by way of a pre-heating operation by the array laser in the similar manner to that of the recording operation, a laser beam is irradiated on a recorded mark, and then, since reflection light from the mark and reflection light from the portion other than this mark are detected, a reproducing signal is acquired.

In the case that a large number of beams are used, focal points of the respective beams are not always located on the separate layers, but, for example, 2 laser beams may be focused onto the same layer to record/reproduce information.

The reproducing signals of the respective beams are restored into a single time-sequential signal by a multiplexing unit (synthesizing means), if necessary. An amplitude of this reproducing signal is amplified by the preamplifier circuit 3-4, and this amplified reproducing signal is converted into 8-bit information every 16 bits in the 8-to-16 demodulator 3-10. Since the above-described operations are carried out, the reproducing operation of the recorded mark is completed. In the case that the mark edge recording operation is carried out under the above-described condition, the mark length of 3T-mark corresponding to the shortest mark becomes approximately 0.4 λm. Such a dummy data made of repeating the 4T-mark and the 4T-space is contained in both a starting edge portion and an end edge portion of an information signal in a recording signal. VFO is also contained in the starting edge portion.

For the signal modulation system, other modulation systems than the 8-to-16 modulation system may also be employed.

Photo-Conductor Layer

As to the photo-conductor layer, in addition to the above-explained As-Se series material, inorganic photo-conductor materials known as CdTe, CdS and CdSe may be employed, and various sorts of such organic conductive materials known as polythiophene (will be discussed in detail in Embodiment 2) may also be used as the photo-conductor material under colored states, although base plate materials are restricted since these base plate materials are required in high-temperature thermal processing operation.

Electrode Materials

Preferable materials as the electrode material having another function of the reflection layer are different from each other, depending upon utilization thereof. In such a case that information rewriting operations are required many times, such electrode materials are preferably utilized which contain tungsten, molybdenum or at least any one of these metal elements, and also, less than 50 atom % of another metal element such as titanium.

On the other hand, in the case of a write-once type disk that only one recording operation is required, or a disk that only a small number of information rewriting operations is required, metals suitable for optical disks, the optical characteristics and the thermal diffusion ratios of which have been especially considered, may be employ as electrodes. As the metal layers whose reflectance and thermal conductivity are high, in the case of either Al or an Al alloy, there are high thermal conductivity materials in which additive elements such as Cr and Ti are smaller than or equal to 4 atom %, and which are capable of preventing a temperature increase of a base plate surface. Subsequently, the metal layers may be employed which are made of a metal element single body selected from Au, Ag, Cu, Ni, Fe, Co, Cr, Ti, Pd, Pt, W, Ta, Mo, Sb, Bi, Dy, Cd, Mn, Mg and V. Alternatively, the metal layers may be made of an alloy which contains as a major component an Au alloy, an Ag alloy, a Cu alloy, a Pd alloy, a Pt alloy, Sb—Bi, SUS, Ni—Cr, or made of such an alloy constituted by these alloys. As previously explained, the reflection layer having the electrode function is made of the metal element, the semi-metal elements, the alloys of these materials and the mixtures. Among these metal elements/alloys/mixtures, the reflection layers having the electrode function which are made of Cu, Ag, Au, a Cu alloy, an Ag alloy, especially, an alloy in which the additive element such as Pd and Cu is smaller than or equal to 8 atom %, or such an alloy as an Au alloy whose thermal conductivity is high, can suppress thermal deteriorations of the organic materials.

As to a material of a transparent electrode, the known transparent electrode materials and conductive organic materials such as polythiophene and polyacetylene may be used. These transparent electrode materials are known from a material having a composition of $(In_2O_3)x(SnO_2)1-x$ where "x" is a range from 5% to 99%; another material where "x" is a range from 90% to 98%, which is more preferable in view of a resistance value; another material made by adding thereto less than or 50 mol % of $SiO_2$; another material of $SnO_2$ made by adding thereto another oxide, e.g., 2 to 5 mol % of $Sb_2O_3$.

Substrate

In this embodiment, the polycarbonate substrate (base plate) 11 having the tracking groove directly formed in the surface thereof has been employed. A base plate having a tracking groove implies such a base plate. That is to say, assuming now that a recording/reproducing wavelength is defined as "λ", a groove having a depth longer than or equal to $λ/15n$ ("n" indicates refractive index of base plate material) is formed in an entire surface of the substrate, or a partial surface of the substrate. The groove may be continuously formed around one circumference, or may be subdivided within one circumference. Also, widths of this groove may be different from each other, depending upon locations. A base plate which owns recordable/reproducible formats on both a groove portion and a land portion may be employed. Alternatively, a base plate which owns a recordable format on either a groove portion or a land portion may be employed. In such a type of substrate that information is recorded only in a groove, the following substrate may be preferably employed, the track pitch of which is nearly equal to 0.7 times of NA of wavelength/focusing length, and the groove width of which is nearly equal to ½ of NA.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information recording apparatus for recording information by irradiating light onto a multilayer information recording medium, the multilayer information recording medium having at least a first layer containing an electro-chromic material, sandwiched by electrode layers applying a voltage to said first layer to color said first layer, and a second layer containing an electro-chromic material sandwiched by electrode layers; comprising:
    means for applying the voltage to said first layer;
    first optical irradiating means for irradiating a first optical spot onto said first layer to speed up one of a coloring operation and a de-coloring operation of said second layer; and second optical irradiating means for irradiating a second optical spot onto said second layer after irradiating said first optical spot onto said first layer.

2. An information recording apparatus as claimed in claim 1 wherein, both said first optical spot and said second optical spot correspond to substantially parallel laser beams, and wherein both said first optical irradiating means and said second optical irradiating means constitute a plurality of light sources arrayed along a substantially same straight line.

3. An information recording apparatus as claimed in claim 2, further comprising means for positioning both said first optical spot and second optical spot on the same track or within number of 3 tracks.

4. An information recording apparatus as claimed in claim 2, further comprising means for detecting one of a tracking error signal and a track-address signal by one of the beams by employing at least two laser beams irradiated from said plurality of light sources.

5. An information recording apparatus as claimed in claim 1, further comprising means for performing an auto-focusing operation by irradiating said first optical spot onto said first layer to speed up one of a coloring operation and a de-coloring operation of said second layer.

6. An information recording method using an information recording medium having at least a first layer containing an electro-chromic material, sandwiched by electrode layers applying a voltage to said first layer to color said first layer, and a second layer containing an electro-chromic material sandwiched by electrode layers provided on the light incident side with respect to said first layer, comprising the steps of;
applying a voltage to said electrode layers;
irradiating a first optical spot onto said first layer thereby increasing a speed of a coloring reaction of said second layer; and
irradiating said second optical spot onto said second layer to record information thereon after irradiating said first optical spot onto said first layer.

7. An information recording method using an information recording medium having at least a first layer containing an electro-chromic material sandwiched by electrode layers applying a voltage to said first layer to color said first layer, and a second layer containing an electro-chromic material sandwiched by electrode layers located on a side opposite to a light incident side with respect to said first layer, comprising the steps of:
applying a voltage to said electrode layer;
irradiating a first optical spot onto said first layer thereby increasing a speed of a de-coloring reaction of said second layer; and
irradiating a second optical spot onto said second layer after irradiating said first optical spot onto said first layer.

8. An information recording apparatus for recording information by irradiating light onto a multilayer information recording medium, the multilayer information recording medium having at least a first layer containing an electro-chromic material, sandwiched by electrode layers applying a voltage to said first layer to color said first layer, and a second layer containing an electro-chromic material sandwiched by electrode layers; comprising:
means for applying the voltage to said layer;
first optical irradiating means for irradiating a first optical spot with a wavelength sufficient for recording on said recording medium onto said first layer to speed up one of a coloring operation and a de-coloring operation of said second layer; and
second optical irradiating means for irradiating a second optical spot with said wavelength onto said second layer after irradiating said first optical spot onto said first layer.

9. An information recording apparatus as claimed in claim 8 wherein, both said first optical spot and said second optical spot correspond to substantially parallel laser beams with said wavelength sufficient for recording on said recording medium, and wherein both said first optical irradiating means and said second optical irradiating means constitute a plurality of light sources arrayed along a substantially same straight line.

10. An information recording apparatus as claimed in claim 9, further comprising means for positioning both said first optical spot and second optical spot which correspond to substantially parallel laser beams with said wavelength sufficient for recording on said recording medium on the same track or within number of 3 tracks.

11. An information recording apparatus as claimed in claim 9, further comprising means for detecting one of a tracking error signal and a track-address signal by one of the beams by employing at least two laser beams irradiated from said plurality of light sources with said wavelength sufficient for recording on said recording medium.

12. An information recording apparatus as claimed in claim 8, further comprising means for performing an auto-focusing operation by irradiating said first optical spot onto said first layer.

* * * * *